US006925804B2

(12) United States Patent
Longnecker et al.

(10) Patent No.: US 6,925,804 B2
(45) Date of Patent: Aug. 9, 2005

(54) METHOD FOR RESPONDING TO SENSOR FAILURES ON EGR/VGT ENGINES

(75) Inventors: John E. Longnecker, Livonia, MI (US); Richard M. Avery, Jr., West Bloomfield, MI (US); Leopold Super, Dearborn, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/674,007

(22) Filed: Sep. 29, 2003

(65) Prior Publication Data

US 2005/0066658 A1 Mar. 31, 2005

(51) Int. Cl.[7] .......................................... F02D 23/007
(52) U.S. Cl. ...................................................... 60/602
(58) Field of Search ............................... 60/600–603

(56) References Cited

U.S. PATENT DOCUMENTS

| 4,671,068 | A | * | 6/1987 | Moody et al. ................ 60/602 |
| 5,440,879 | A | * | 8/1995 | Dellora ........................ 60/602 |
| 5,987,888 | A | * | 11/1999 | Weisman et al. ............. 60/612 |
| 6,134,889 | A | * | 10/2000 | Markyvech et al. .......... 60/602 |
| 6,253,551 | B1 | | 7/2001 | Lohmann et al. |
| 6,272,859 | B1 | * | 8/2001 | Barnes et al. ................. 60/602 |
| 6,360,541 | B2 | * | 3/2002 | Waszkiewicz et al. ........ 60/602 |
| 6,457,461 | B1 | | 10/2002 | Romzek ....................... 60/602 |
| 6,619,261 | B1 | * | 9/2003 | Wang et al. .................. 60/602 |
| 6,672,060 | B1 | * | 1/2004 | Buckland et al. ............. 60/602 |

FOREIGN PATENT DOCUMENTS

| DE | 40 32 451 A1 | 4/1992 |
| JP | 3164551 A | 7/1991 |
| JP | 2000345851 A | 12/2000 |

* cited by examiner

Primary Examiner—Thai-Ba Trieu
(74) Attorney, Agent, or Firm—Brooks Kushman P.C.

(57) ABSTRACT

A method for controlling an internal combustion engine having a variable geometry turbocharger (VGT) and an exhaust gas recirculation (EGR) system in the face of sensor failures and mechanical faults includes generating accurate substitute values for use by the engine control logic when EGR and VGT system-related sensors are diagnosed as having failed during operation, and maintaining controlled performance of the VGT system in the face of sensor failures or mechanical faults associated with the EGR or VGT system.

7 Claims, 5 Drawing Sheets

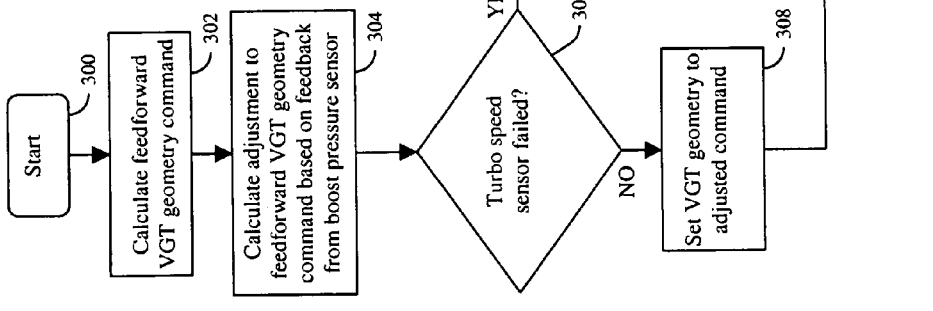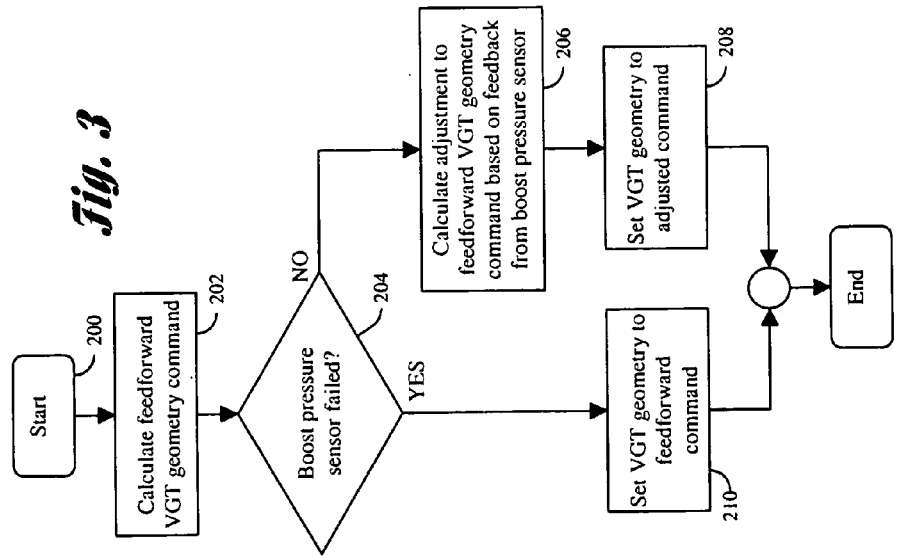

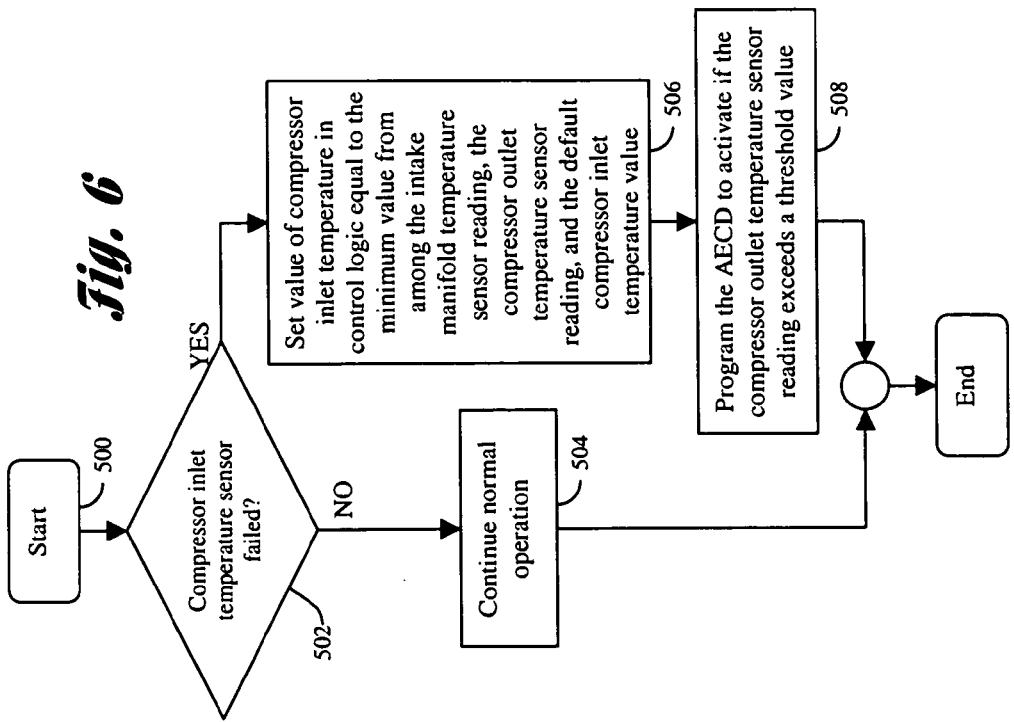
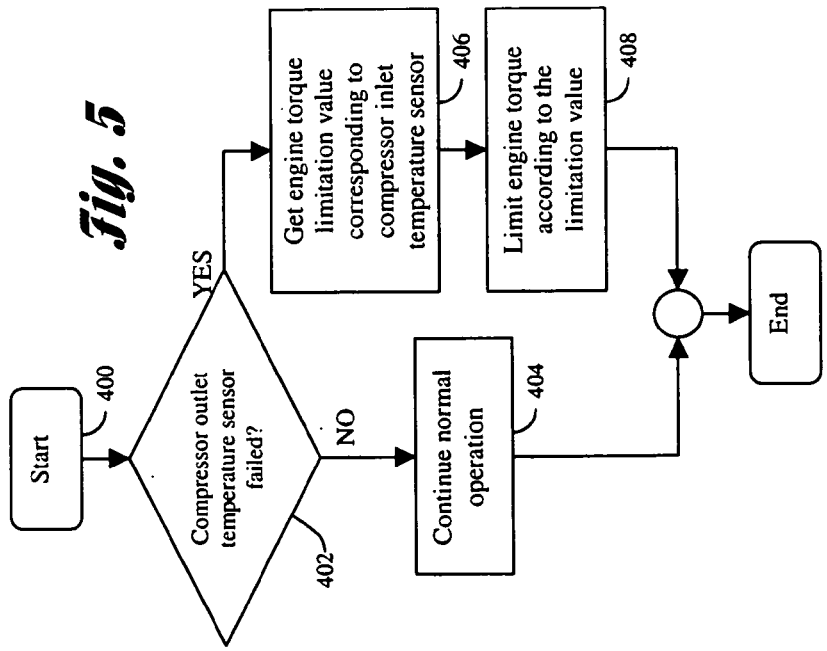

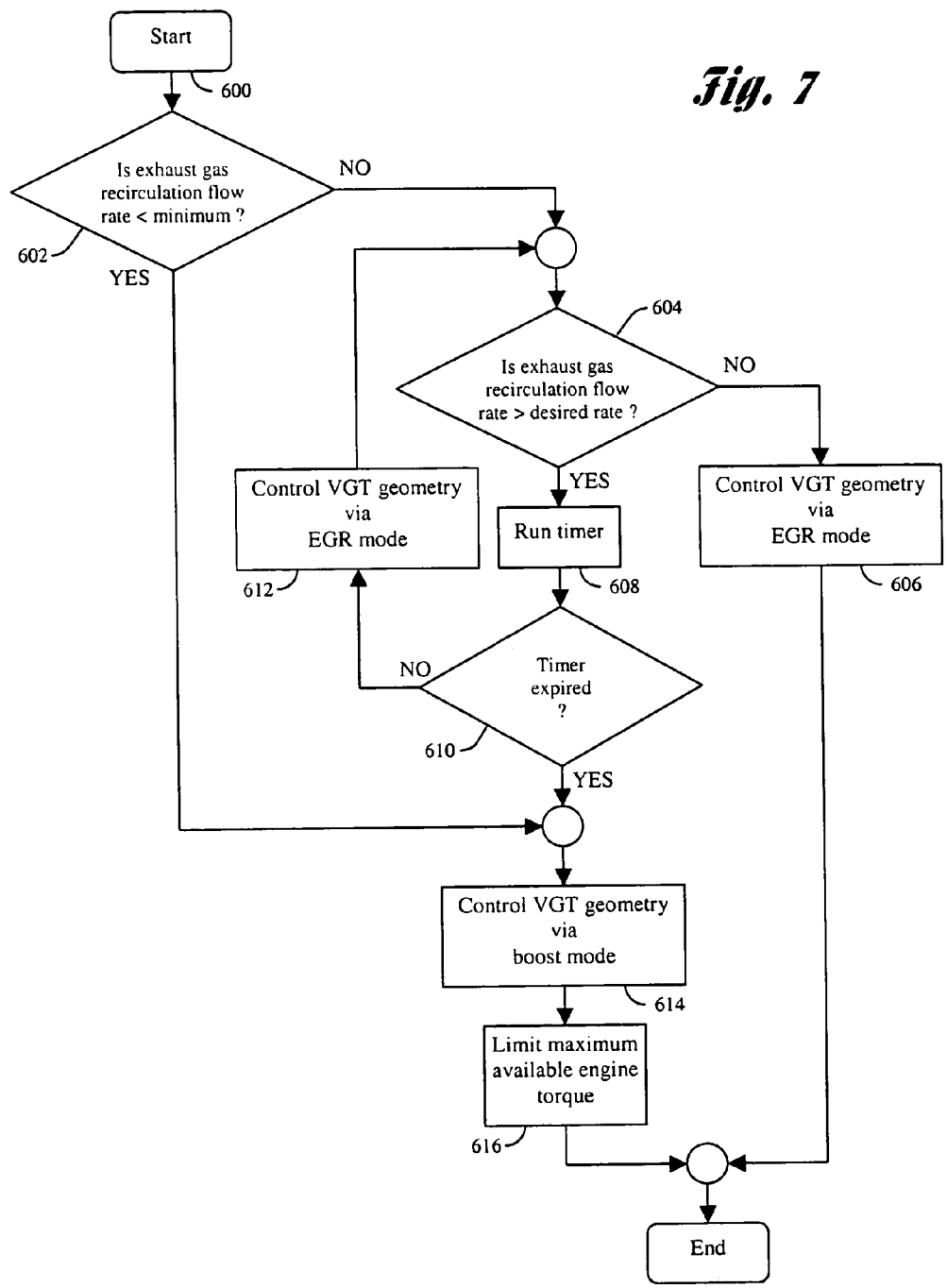

METHOD FOR RESPONDING TO SENSOR FAILURES ON EGR/VGT ENGINES

BACKGROUND OF THE INVENTION

1. Field of the Invention

The present invention relates to methods for the control of internal combustion engines with turbochargers and exhaust gas recirculation.

2. Background Art

To improve performance, many internal combustion engines, particularly diesel engines, include a turbocharger to increase the oxygen density of the cylinder charge. Turbochargers use the engine exhaust gases to operate a turbine which in turn powers a compressor to compress intake air. Variable geometry turbochargers (VGT), which include variable nozzle turbochargers (VNT), are used to modify turbocharger characteristics over a broader engine operating range than that possible with conventional turbochargers. Moveable intake or exhaust vanes (VNT) or a moveable turbine sidewall may be used to provide an appropriate amount of turbo boost pressure for current operating conditions and driver demanded engine torque.

Exhaust gas recirculation (EGR) has known advantages with respect to reducing emissions of nitrogen oxides (NOx) by reducing peak combustion temperatures within the engine cylinders. EGR systems typically include an EGR valve which diverts engine exhaust gases from the engine exhaust manifold to the engine intake manifold. This requires a pressure differential between the exhaust and intake manifolds for the gas to flow from the exhaust to the intake. Naturally aspirated engines typically create a vacuum at the intake and have a considerably higher exhaust gas pressure which easily flows any desired amount of EGR. For turbocharged engines, additional back pressure may be required to provide a sufficient pressure differential to introduce the exhaust gas into the compressed intake air. One method for controlling back pressure is to modify the geometry of a VNT or VGT.

To achieve the benefits associated with EGR, both the EGR system components and VGT system components should be in proper working order. Various diagnostics have been developed to monitor the EGR system and VGT system. One such system is described in U.S. Pat. No. 6,457,461 to Romzek. Diagnosable malfunctions include both sensor failures and mechanical faults. Typically, EGR and VGT control systems respond to sensor failures by substituting stored default values for continued operation. However, because these stored default values are inflexible imperfect approximations, emissions reduction and engine efficiency can suffer greatly. When mechanical faults occur, continued error compensation attempts by the engine control logic typically force the variable geometry mechanism into either a completely open or completely closed position, also causing emissions reduction and engine efficiency to suffer.

SUMMARY OF THE INVENTION

One object of the present invention is to provide a method for generating accurate substitute values for use by the engine control logic when EGR and VGT system-related sensors are diagnosed as having failed during operation.

Another object of the present invention is to provide a method for maintaining controlled performance of the VGT system in the face of sensor failures or mechanical faults associated with the EGR or VGT system.

In carrying out the above objects and other objects, features, and advantages of the present invention, a method for measuring an approximate barometric pressure for use in the control logic for an EGR/VGT internal combustion engine includes commanding the VGT to a zero boost geometry while the engine is idling, maintaining the zero boost geometry long enough for any significant existing turbo speed to dissipate, and then using the boost pressure sensor reading as the value of the barometric pressure in the control logic. A method for maintaining control of the VGT in the face of a boost pressure sensor failure includes controlling the VGT solely with a feedforward VGT geometry command, based on factors such as engine speed and demanded engine torque, when boost pressure sensor feedback is not available. A method for controlling an EGR/VGT internal combustion engine in the face of a VGT turbo speed sensor failure includes restricting the VGT geometry command so that it is not allowed to adjust feedforward VGT geometry command in a direction that would increase turbo speed. A method for controlling an EGR/VGT internal combustion engine in the face of a VGT compressor outlet temperature sensor failure includes limiting the engine torque by a value obtained with reference to the VGT compressor inlet temperature. A method for controlling an EGR/VGT internal combustion engine in the face of a VGT compressor inlet temperature sensor failure includes using the minimum from among the intake manifold temperature sensor reading, the compressor outlet temperature sensor reading, and a default compressor inlet temperature value as the value of the compressor inlet temperature in the control logic. A method for controlling an EGR/VGT internal combustion engine in the face of an EGR mechanical fault includes switching from actuating the VGT geometry to control EGR flow rate, to actuating the VGT geometry to control boost pressure, when the EGR flow rate is less than a minimum acceptable EGR flow rate, or greater than a desired EGR flow rate throughout a predetermined time interval.

A number of advantages are associated with the present invention. For example, the present invention provides a method for control of interrelated engine components that provides efficient engine operation and emissions reduction in the face of sensor failures and mechanical faults. In particular, the present invention provides a method for determining approximate values for failed sensors for use in the control logic, and for maintaining a degree of control over the EGR and VGT systems in the face of failed sensors and mechanical faults.

The above features, benefits and advantages and other features, benefits and advantages of the present invention are readily apparent from the following detailed description of the best mode for carrying out the invention when taken together with the accompanying drawings.

BRIEF DESCRIPTION OF THE DRAWINGS

FIG. 3 is a flowchart illustrating operation of a method for modifying control of the VGT geometry after failure of the boost pressure sensor according to one embodiment of the present invention;

FIG. 4 is a flowchart illustrating operation of a method for modifying control of the VGT geometry after failure of the turbo speed sensor according to one embodiment of the present invention;

FIG. 5 is a flowchart illustrating operation of a method for modifying control of the engine after failure of the compressor outlet temperature sensor according to one embodiment of the present invention;

FIG. 6 is a flowchart illustrating operation of a method for approximating the compressor inlet temperature for use in an EGR/VGT control logic according to one embodiment of the present invention; and FIG. 7 is a flowchart illustrating operation of a method for modifying control of the VGT geometry when the EGR flow rate is greater than a desired value over a predetermined time interval, or less than a minimum acceptable value, according to one embodiment of the present invention.

DETAILED DESCRIPTION OF THE PREFERRED EMBODIMENT(S)

Figure 1:
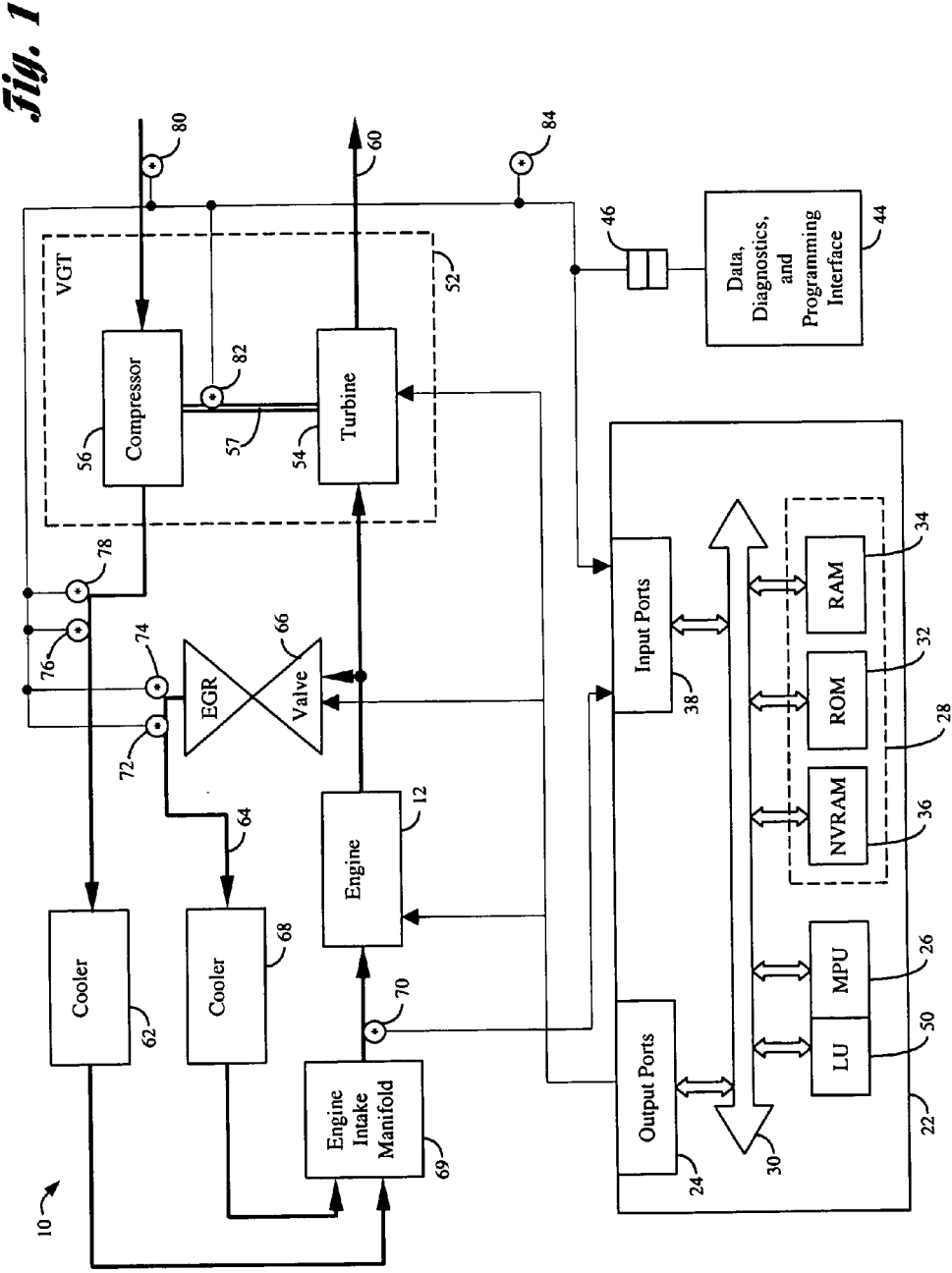
FIG. 1 is a schematic diagram illustrating operation of a method for EGR/VGT diagnosis and control according to one embodiment of the present invention.

With reference to FIG. 1, an internal combustion engine and associated control systems and subsystems are generally indicated at 10. System 10 includes an engine 12 having a plurality of cylinders, each fed by a fuel injector. In a preferred embodiment, engine 12 is a compression-ignition internal combustion engine, such as a heavy duty diesel engine. The injectors receive pressurized fuel from a fuel supply in a known manner. Various sensors are in electrical communication with a controller 22 via input ports 38. Controller 22 preferably includes a microprocessor 26 in communication with various computer readable storage media 28 via data and control bus 30. Computer readable storage media 28 may include any of a number of known devices which function as read only memory 32, random access memory 34, and non-volatile random access memory 36.

Computer readable storage media 28 have instructions stored thereon that are executable by controller 22 to perform methods of controlling the internal combustion engine, including variable flow exhaust gas recirculation (EGR) valve 66 and variable geometry turbocharger (VGT) 52. The program instructions are executed by controller 22 in microprocessor 26 to control the various systems and subsystems of the engine and/or vehicle. In addition, various instructions may also be executed by any number of logic units 50. Input ports 38 receive signals from various sensors, and controller 22 generates signals at output ports 24 that are directed to the various engine and/or vehicle components.

A data, diagnostics, and programming interface 44 may also be selectively connected to controller 22 via a plug 46 to exchange various information therebetween. Interface 44 may be used to change values within the computer readable storage media 28, such as configuration settings, calibration variables, instructions for EGR and VGT control and others.

In operation, controller 22 receives signals from the various engine/vehicle sensors and executes control logic embedded in hardware and/or software to control the engine. In a preferred embodiment, controller 22 is the DDEC controller available from Detroit Diesel Corporation, Detroit, Mich. Various other features of this controller are described in detail in a number of U.S. patents assigned to Detroit Diesel Corporation. Control logic may be implemented in hardware, firmware, software, or combinations thereof. Further, control logic may be executed by controller 22, in addition to by any of the various systems and subsystems of the vehicle cooperating with controller 22.

Further, although in a preferred embodiment, controller 22 includes microprocessor 26, any of a number of known programming and processing techniques or strategies may be used to control an engine in accordance with the present invention.

With continuing reference to FIG. 1, controller 22 provides enhanced engine performance by controlling a variable flow exhaust gas recirculation valve 66 and a variable geometry turbocharger (VGT) 52. VGT 52 includes a turbine 54 and a compressor 56 mounted on a common shaft 57. The pressure of the engine exhaust gasses causes the turbine to spin which in turn drives the compressor. The spinning compressor creates turbo boost pressure which develops increased power during combustion.

A variable geometry or variable nozzle turbocharger has moveable components in addition to the rotor group. These moveable components can change the VGT geometry by changing the area or areas in the turbine stage through which exhaust gasses from the engine flow, and/or changing the angle at which the exhaust gasses enter or leave the turbine. Depending upon the VGT geometry, the VGT supplies varying amounts of turbo boost pressure to the engine. The VGT geometry may be electronically controlled to vary the amount of turbo boost pressure based on various operating conditions.

In a typical VGT, the turbine housing is oversized for an engine, and the air flow is choked down to the desired level. There are several designs for the VGT. In one design, a variable inlet nozzle has a cascade of moveable vanes which are pivotable to change the area and angle at which the airflow enters the turbine wheel. In another design, the VGT has a moveable side wall which varies the effective cross-sectional area of the turbine housing. In general, the airflow through the turbine, and hence the turbine speed and resultant boost pressure at the compressor outlet, are controlled by varying the geometry of the VGT. It is appreciated that embodiments of the present invention are not limited to any particular structure for the VGT. That is, the term VGT or VNT as used herein means any controllable air pressurizing device including the above examples, and including a modulated waste gate valve.

An exhaust gas recirculation (EGR) system selectively introduces a metered portion of the exhaust gasses into the intake manifold 69. The EGR system dilutes the incoming fuel charge and lowers peak combustion temperatures to reduce the amount of oxides of nitrogen produced during combustion. The amount of exhaust gas to be recirculated is controlled by EGR valve 66 and VGT 52. In accordance with the present invention, the EGR valve is a variable flow valve that is electronically controlled by controller 22. The geometry of the VGT is also electronically controlled by controller 22. There are many possible configurations for a controllable EGR valve and embodiments of the present invention are not limited to any particular structure for the EGR valve.

As mentioned previously, various sensors are located throughout the engine to provide feedback to controller 22. An engine intake manifold temperature sensor 70 monitors the temperature of the gas mixture entering the engine. An EGR differential pressure sensor 72 and EGR temperature sensor 74 allow the controller to determine the mass flow rate through the EGR valve. Boost pressure sensor 76 provides the controller with a measurement of the boost pressure provided by the VGT compressor, while compressor outlet temperature sensor 78 provides feedback of the temperature of the airflow leaving the VGT compressor. Compressor inlet temperature sensor 80 measures the temperature of the airflow entering the VGT compressor. Turbo speed sensor 82 measures the rotational speed of the VGT turbine shaft. Barometric pressure sensor 84 measures the ambient pressure. In addition, it is appreciated that various different sensor configurations may be utilized in various parts of the exhaust flow paths to allow controller 22 to determine the various mass flow rates throughout the exhaust system, including flow through the EGR system and flow through the compressor, etc. depending on the particular application.

In some embodiments, it may be desirable to provide a cooler 62 to cool the charge air coming from compressor 56. Similarly, in some embodiments, it may be desirable to provide a cooler 68 to cool the flow through the EGR system prior to reintroduction into the intake manifold 69 of engine 12 to further reduce peak combustion temperatures and the production of nitrogen oxides.

Embodiments of the present invention include control logic that processes various inputs representing various engine conditions, and in turn, provides an EGR command signal and a VGT command signal. The EGR command signal commands a position for the variable flow EGR valve 66 to control gas flow through path 64, while the VGT command signal commands a geometry for VGT 52 to control gas flow through path 60. The controller 22 may operate in one of at least two control modes. In EGR control mode, the controller 22 attempts to actuate the geometry of the VGT 52 to provide the desired EGR flow rate. In boost control mode, the controller 22 attempts to actuate the geometry of the VGT 52 to provide the desired boost pressure.

Figure 2:
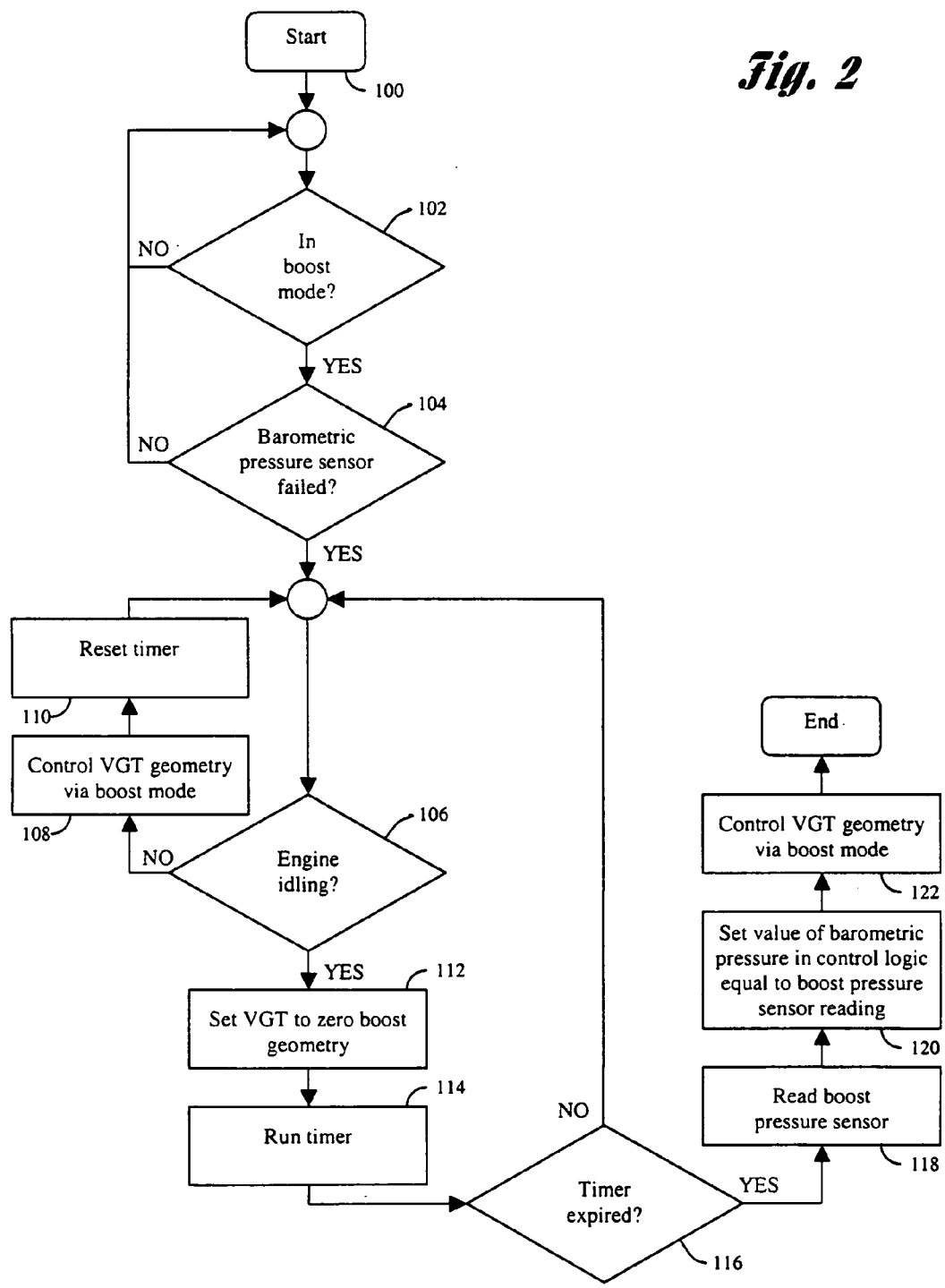
FIG. 2 is a flowchart illustrating operation of a method for measuring an approximate barometric pressure for use in an EGR/VGT control logic according to one embodiment of the present invention.

In a preferred embodiment of the present invention, a technique utilized to measure an approximate value for the barometric pressure, for example if barometric pressure sensor 84 fails, for use in the control logic is best shown in FIG. 2. In FIG. 2, block 100 initiates the barometric pressure approximation routine. The controller determines whether the engine is currently operating in boost control mode or EGR control mode as represented by block 102. If the engine is operating in boost control mode, the controller determines whether the barometric pressure sensor has failed as represented by block 104. The next step is to determine whether the engine is idling, as represented by block 106. A preferred embodiment is to perform the estimation procedure while the engine is idling, because during idle there is no practical need for boost pressure. If the engine is idling, the VGT geometry is set to a position which produces approximately zero boost pressure, as represented by block 112. A timer is then counted down, as shown in block 114, to track whether the VGT geometry has remained set for zero boost long enough to allow the VGT shaft to spin down. The required time interval can be determined offline via calibration, and the timer running time can be set offline to match the required time interval via the previously described data, diagnostics, and programming interface 44, for example. The next step is to check whether the timer has expired, as shown in block 116. If the timer has not yet expired, subsequent checks are made to determine whether the engine is still idling, as represented by block 106. If the engine is not idling, it is generally impractical to maintain a zero boost VGT geometry, so control of the VGT geometry is returned to boost mode, as shown in block 108. The timer is then reset, as shown in block 110, so the timed zero boost procedure can be attempted again the next time an engine idling condition is detected. The method then continues to check for the engine idling condition, as illustrated.

If the timer expires, as shown by the "YES" branch exiting block 116, then the zero boost geometry has been maintained long enough that a measurement produced by the boost pressure sensor, as represented by block 118, is now an approximation of the barometric pressure, since the VGT has added approximately zero boost pressure to the incoming ambient air at barometric pressure. The value of the barometric pressure for use in the control logic is set to equal this measurement of the boost pressure sensor, as shown in block in 120. Finally, control of the VGT geometry is returned to the boost mode control logic, as shown in block 122.

Referring now to FIG. 3, a flow chart is shown illustrating a method for controlling the boost pressure produced by the VGT when the boost pressure sensor has failed according to one embodiment of the present invention. Block 200 represents the start of the method. The first step in controlling the boost pressure is to calculate a feedforward VGT geometry command, as shown in block 202, to provide the boost pressure theoretically required to meet the desired engine performance. In a preferred embodiment, the feedforward VGT geometry command is calculated from the current engine speed and current user-demanded engine torque. The next step is to check whether the boost pressure sensor has failed, as represented in block 204. If the boost pressure sensor has not failed, an adjustment to the feedforward command is calculated, based in part on feedback from the boost pressure sensor, as represented in block 206. The VGT geometry is then set to the adjusted value, as shown in block 208. If the boost pressure sensor has failed, on the other hand, the calculated adjustment based on an open sensor reading, or on a stored default value as in the prior art, would lead to a VGT geometry command that would typically bear little relation to the desired boost pressure. In the current invention, the adjustment in this case is ignored and the VGT geometry is set according to the feedforward command, as indicated in block 210.

FIG. 4 shows a method for controlling the boost pressure produced by the VGT when the turbo speed sensor has failed according to one embodiment of the present invention. Block 300 represents the beginning of the method. Again, the first step in controlling the boost pressure is to calculate a feedforward VGT geometry command, as shown in block 302, to provide the boost pressure theoretically required to meet the desired engine performance. The next step is to calculate an adjustment to the feedforward command based in part on feedback from the boost pressure sensor, as represented in block 304. Block 306 represents a check on the condition of the turbo speed sensor. If the turbo speed sensor has not failed, the VGT geometry is set according to the adjusted command, as shown in block 308. If the turbo speed sensor has failed, the effect of the calculated command adjustment on the turbo speed is examined, as represented in block 310. If the adjustment to the VGT geometry would not increase the turbo speed, the VGT geometry is set according to the adjusted command, as shown in block 312. If, however, the adjustment to the VGT geometry would increase the turbo speed, the adjustment is ignored and the VGT geometry is set according to the feedforward command, as shown in block 314. The method thus provides a safeguard against a turbo overspeed condition when the turbo speed sensor is not available to provide feedback for turbo speed limiting, while allowing fine tuning of the VGT geometry when it is evident that the fine tuning will not lead to an overspeed condition. In a preferred embodiment, the method also limits the maximum available engine torque when it is determined that the turbo speed sensor has failed, as shown in block 316.

FIG. 5 shows a method for limiting the engine torque when the VGT compressor outlet temperature sensor has failed according to one embodiment of the present invention. Block 400 represents the beginning of the method. The first step is to determine whether the compressor outlet temperature sensor has failed, as shown in block 402. If the sensor has not failed, engine operation and control continue as before, as represented by block 404. If the sensor has failed, an engine torque limitation value corresponding to the compressor inlet temperature is determined, as represented in block 406. In a preferred embodiment, the engine torque limitation value is expressed in terms of a percentage of maximum available engine torque, and the engine torque limitation value for a given compressor inlet temperature is determined by use of a lookup table. The engine torque is then limited according to the limitation value, as shown in block 408.

FIG. 6 shows a method for approximating a value for the VGT compressor inlet temperature for use in the control logic if the compressor inlet temperature sensor 80 fails. The control logic typically uses the compressor inlet temperature as part of the determination of whether the Auxiliary Emissions Control Device (AECD) logic should be activated, allowing the engine to allowably exceed standard regulated emissions levels in order to, for example, prevent air system damage. Water vapor condensation from the incoming air flow is one condition that merits activation of the AECD. The threat of condensation is a concern at low ambient temperatures, so preferably for these purposes a substitute compressor inlet temperature value would err, if at all, on the low side. On the other hand, the compressor inlet temperature also becomes important at high ambient temperatures, along with the compressor outlet temperature, as part of the determination of whether air handling concerns merit the activation of the AECD logic, and for these purposes a low substitute value would be undesirable. The method of the present invention reconciles these seemingly conflicting design objectives as follows.

With continuing reference to FIG. 6, block 500 represents the start of the method. As shown in block 502, the first step of the method is to determine whether the compressor inlet temperature sensor has failed. If it has not, normal operations continue, as represented by block 504. If the sensor has failed, the value of the compressor inlet temperature for use in the control logic is set to the minimum value from among the intake manifold temperature sensor, the compressor outlet temperature sensor, and a stored default compressor inlet temperature value, as represented by block 506. This part of the method produces an effective substitute compressor inlet temperature for the condensation analysis, which is only of concern at low ambient temperatures. The control logic then mitigates the air handling concerns at high ambient temperatures by programming the AECD to activate if the compressor outlet temperature sensor reading exceeds a threshold value, as shown in block 508. In this way, the method meets both the low ambient temperature requirements and the high ambient temperature requirements of a substitute compressor inlet temperature value.

In FIG. 7, a method for controlling the EGR and VGT systems in the face of an EGR valve mechanical fault is described. The beginning of the method is indicated by block 600. The first step of the method is to determine if the EGR flow rate is less than a minimum acceptable flow rate, as shown in block 602. If the flow rate is less than the minimum acceptable rate, a fault in the mechanical operation of the EGR valve is likely present. In this case, there is nothing to be gained by attempting to control the VGT geometry to provide a desired EGR flow rate, so the control logic operates in boost mode, as shown in block 614.

With continuing reference to FIG. 7, if the EGR flow rate is not below the minimum acceptable rate, the next step is to compare the EGR flow rate to the desired EGR flow rate, as represented in block 604. If the EGR flow rate is not greater than the desired flow rate, this indicates that both the EGR valve and the moveable component of the VGT are functioning properly, and the control logic operates in EGR mode, as shown in block 606. If, on the other hand, the EGR flow rate is greater than the desired flow rate, a possible mechanical fault is indicated. In this case a timer is run, as represented in block 608, to track whether the EGR flow rate remains higher than the desired rate for a specified time interval. The status of the timer is monitored, as shown in block 610. While the timer has not expired, the control logic continues to attempt to control the VGT geometry in EGR mode, as shown in block 612. The error status of the EGR flow rate is monitored as illustrated until either the EGR flow ceases to be greater than the desired rate, in which case EGR mode control is set as shown in block 606, or until the timer expires. If the timer expires, a mechanical fault is assumed, and the control logic thereafter controls in boost mode as shown in block 614. In a preferred embodiment, after an EGR flow rate that is either greater than the desired rate over a specified time interval, or less than the minimum acceptable rate, is detected, the engine torque is also limited in view of the suspected mechanical fault, as shown in block 616.

As such, the present invention provides a method for control of interrelated engine components that provides improved engine efficiency and emissions reduction in the face of sensor failures and mechanical faults. In particular, the present invention provides a method for determining more accurate substitute values for failed sensors for use in the control logic, and for maintaining a degree of control in the face of failed sensors and mechanical faults.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling an internal combustion engine having a variable geometry turbocharger (VGT) to provide a boost pressure at an engine intake, the VGT having a boost pressure sensor, the method comprising:

calculating a feedforward VGT geometry command to provide a desired boost pressure;

monitoring whether the boost pressure sensor has failed;

calculating an adjusted VGT geometry command based at least partially on feedback from the boost pressure sensor, wherein the adjusted VGT geometry command comprises adjusting the feedforward VGT geometry command;

setting a VGT geometry according to the adjusted VGT geometry command if the boost pressure sensor has not failed; and setting the VGT geometry according to the feedforward VGT geometry command if the boost pressure sensor has failed.

2. The method of claim 1 wherein the feedforward VGT geometry command is calculated from an engine speed and a demanded engine torque.

3. The method of claim 1 wherein the VGT is a variable nozzle turbocharger having movable vanes and the feedforward VGT geometry command is expressed as a command to open the vanes.

4. A method for controlling an internal combustion engine having a variable geometry turbocharger (VGT) to provide a boost pressure at an engine intake, the variable geometry turbocharger having a turbine shaft, a boost pressure sensor, and a turbo speed sensor for measuring a rotational speed of the turbine shaft, the method comprising:

calculating a feedforward VGT geometry command to provide a desired boost pressure;

calculating an adjusted VGT geometry command based at least partially on feedback from the boost pressure sensor, wherein the adjusted VGT geometry command comprises an adjustment to the feedforward VGT geometry command;

monitoring whether the turbo speed sensor has failed;

setting a VGT geometry according to the adjusted VGT geometry command if the turbo speed sensor has not failed and if adjustment to the feedforward VGT geometry command would not increase the rotational speed of the turbine shaft; and setting the VGT geometry according to the feedforward VGT geometry command if the adjustment to the feedforward VGT geometry command would increase the rotational speed of the turbine shaft and the turbo speed sensor has failed.

5. The method of claim 4 wherein the feedforward VGT geometry command is calculated from an engine speed and a demanded engine torque.

6. The method of claim 4 wherein the VGT is a variable nozzle turbocharger having movable vanes; and the rotational speed of the turbine shaft increases when the adjusted VGT geometry command closes the movable vanes.

7. The method of claim 4, further comprising:

limiting a maximum available engine torque if the turbo speed sensor has failed.

\* \* \* \* \*